(12) United States Patent
Rühl et al.

(10) Patent No.: US 11,839,928 B2
(45) Date of Patent: Dec. 12, 2023

(54) ULTRASONIC METAL WELDING DEVICE

(71) Applicant: SCHUNK SONOSYSTEMS GMBH, Wettenberg (DE)

(72) Inventors: Sebastian Rühl, Wetter (DE); Peter Wagner, Wettenberg (DE); Udo Wagenbach, Buseck (DE); Heiko Strobel, Münzenberg (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 0 days.

(21) Appl. No.: 17/823,659

(22) Filed: Aug. 31, 2022

(65) Prior Publication Data

US 2022/0402069 A1 Dec. 22, 2022

Related U.S. Application Data

(62) Division of application No. 16/636,425, filed as application No. PCT/EP2018/072961 on Aug. 27, 2018, now Pat. No. 11,458,562.

(30) Foreign Application Priority Data

Aug. 29, 2017 (DE) ...................... 10 2017 119 809.1

(51) Int. Cl.
*B23K 20/00* (2006.01)
*B23K 20/10* (2006.01)
*B23K 20/18* (2006.01)

(52) U.S. Cl.
CPC .......... *B23K 20/106* (2013.01); *B23K 20/004* (2013.01); *B23K 20/18* (2013.01)

(58) Field of Classification Search
CPC .......... B23K 20/10–106; B23K 20/004; B23K 20/18; B23K 2101/38; B23K 2103/10;
(Continued)

(56) References Cited

U.S. PATENT DOCUMENTS 10,046,874 B2 * 8/2018 Aurand .................. B65D 75/12
10,486,370 B1 * 11/2019 Aurand ............... B29C 66/1122
(Continued)

FOREIGN PATENT DOCUMENTS

CN 101745737 A 6/2010
CN 106624331 A 5/2017
(Continued)

OTHER PUBLICATIONS

International Search Report, dated Jan. 2, 2019, for International Application PCT/EP2018/072961.
(Continued)

*Primary Examiner* — Kiley S Stoner
(74) *Attorney, Agent, or Firm* — LADAS & PARRY LLP; Malcolm J. MacDonald, Esq.

(57) ABSTRACT

An ultrasonic metal welding device for welding electrical conductors using a compression chamber that is adjustable at least n height and that is delimited on opposite sides by a section of a sonotrode as a first delimiting surface and by at least one section of a counter electrode (156) as a second delimiting surface, wherein for welding, the counter electrode and the sonotrode are displaced relative to one another. The counter electrode used is one that comprises sections (152, 154) of geometrically different working surfaces or is composed of at least two sections that are displaceable relative to one another.

15 Claims, 8 Drawing Sheets

Figure 1:
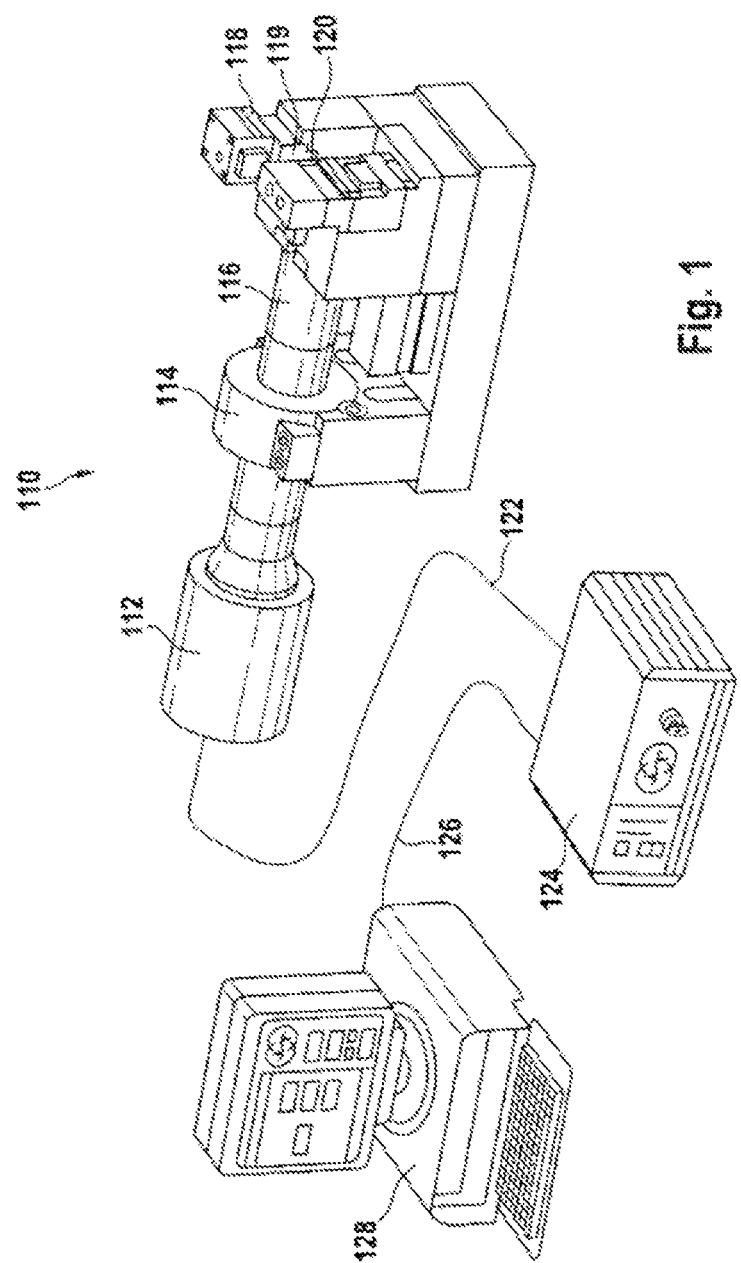

(58) Field of Classification Search
CPC .............. B23K 20/002; B23K 2101/10; H01R 43/0207; B29C 65/08–088
USPC .................. 228/1.1, 110.1; 156/580.1–580.2
See application file for complete search history.

(56) References Cited

U.S. PATENT DOCUMENTS

| | | | |
|---|---|---|---|
| 2004/0232202 A1* | 11/2004 | Mosca | B65B 13/325 |
| | | | 156/580.2 |
| 2009/0218134 A1 | 9/2009 | Stroh et al. | |
| 2012/0298645 A1 | 11/2012 | Kleespiess et al. | |
| 2013/0062397 A1 | 3/2013 | Stroh et al. | |
| 2015/0060135 A1 | 3/2015 | Handel et al. | |
| 2015/0288123 A1* | 10/2015 | Wagner | H01R 4/029 |
| | | | 228/110.1 |
| 2016/0023297 A1 | 1/2016 | Stroh et al. | |
| 2016/0116355 A1 | 4/2016 | Stroh | |
| 2016/0136753 A1 | 5/2016 | Ruhl et al. | |
| 2017/0282289 A1 | 10/2017 | Wagner et al. | |

FOREIGN PATENT DOCUMENTS

| | | | | |
|---|---|---|---|---|
| CN | 101658838 A | | 3/2019 | |
| DE | 36 36 072 C1 | | 3/1988 | |
| DE | 3636072 C | * | 3/1988 | ........... B23K 20/106 |
| DE | 3636072 C1 | * | 3/1988 | |
| DE | 37 19 083 C1 | | 9/1988 | |
| DE | 44 29 484 A1 | | 2/1996 | |
| DE | 102 10 075 A1 | | 9/2003 | |
| DE | 103 30 270 A1 | | 2/2004 | |
| DE | 10330270 A1 | * | 2/2004 | ........... B23K 20/106 |
| DE | 10 2005 004 899 A1 | | 8/2006 | |
| DE | 10 2008 045 751 A1 | | 3/2010 | |
| DE | 10 2010 016 415 A1 | | 10/2011 | |
| DE | 10 2010 039 003 A1 | | 2/2012 | |
| DE | 10 2011 014 801 A1 | | 9/2012 | |
| EP | 0 143 936 B1 | | 9/1986 | |
| FR | 2605539 A1 | * | 4/1988 | |
| JP | 2005-177864 A | | 7/2005 | |
| JP | 2005177864 A | * | 7/2005 | ............. B23K 20/10 |
| JP | 2007-134307 A | | 5/2007 | |
| JP | 2012-223780 A | | 11/2012 | |
| JP | 2012223780 A | * | 11/2012 | |
| KR | 10-2011-0068526 A | | 6/2011 | |
| KR | 20110068526 A | | 6/2011 | |
| KR | 20110068526 A | * | 6/2011 | |
| KR | 101084593 B1 | | 11/2011 | |
| WO | 95/10866 A1 | | 4/1995 | |

OTHER PUBLICATIONS

Japanese Office Action, dated May 10, 2022, corresponding to Japanese Application No. 2020-511256.
Notice of Preliminary Rejection, dated Oct. 18, 2022, corresponding to Korean Application No. 10-2020-7007900.
Chinese Office Action, dated May 19, 2021, corresponding to Chinese Application No. 201880056572.8.
Hans-Dieter Golde, "Ultrasonic Metal Welding—Principles and application of high-grade bonding technology", 1995, pp. 1-70; published by verlag moderne industrie, D-86895 Landsberg/Lech, Germany.

* cited by examiner

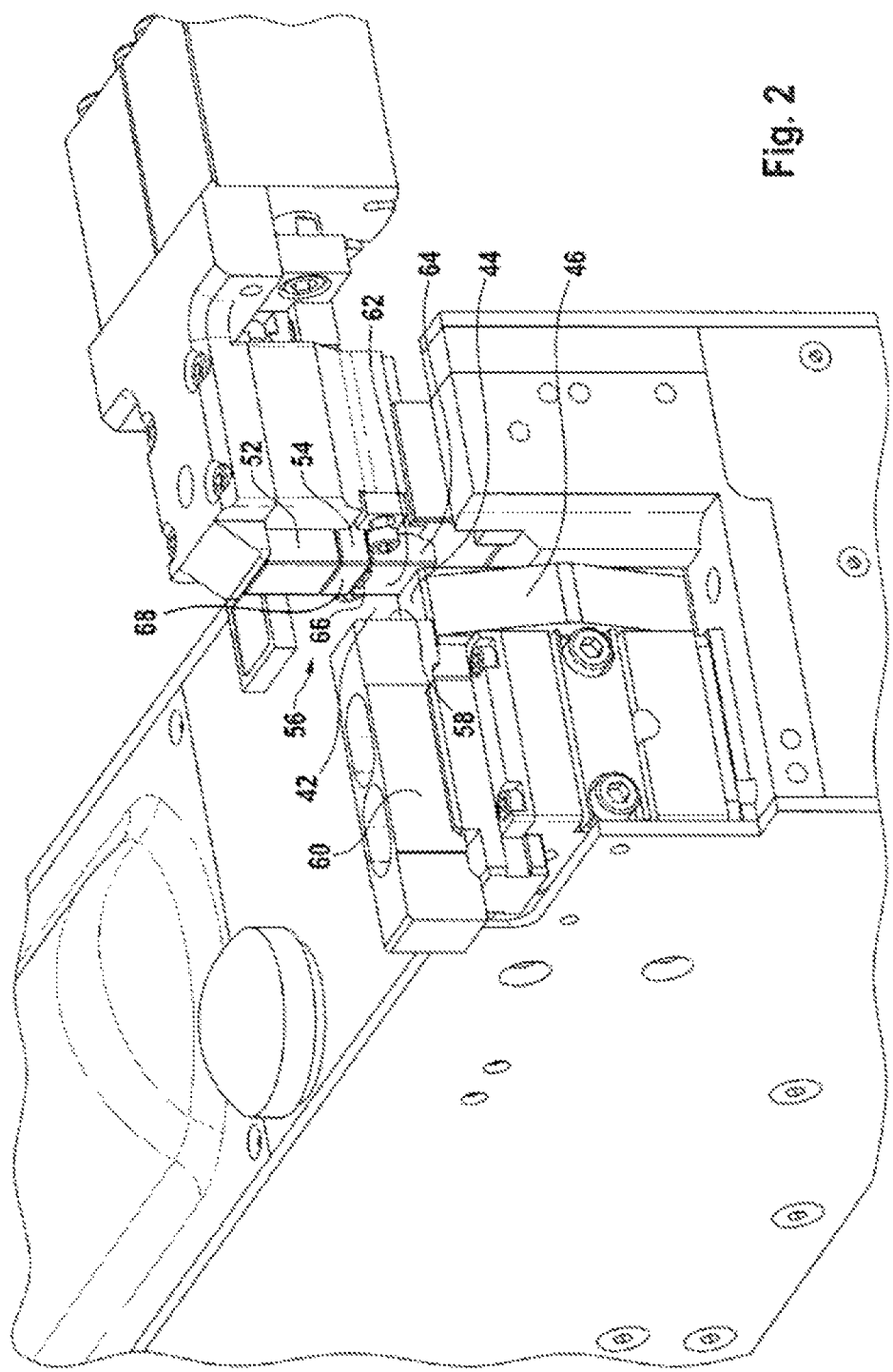

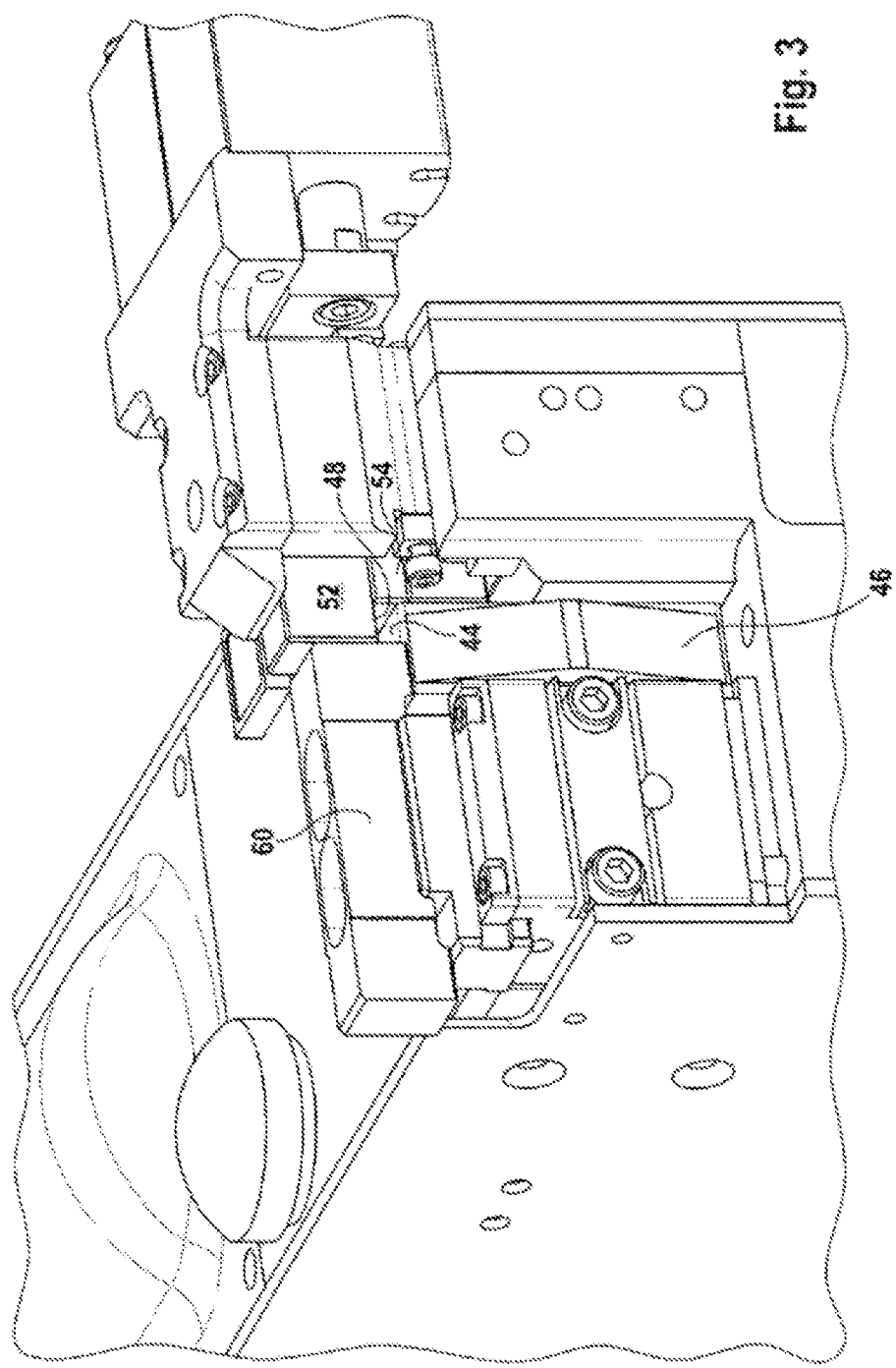

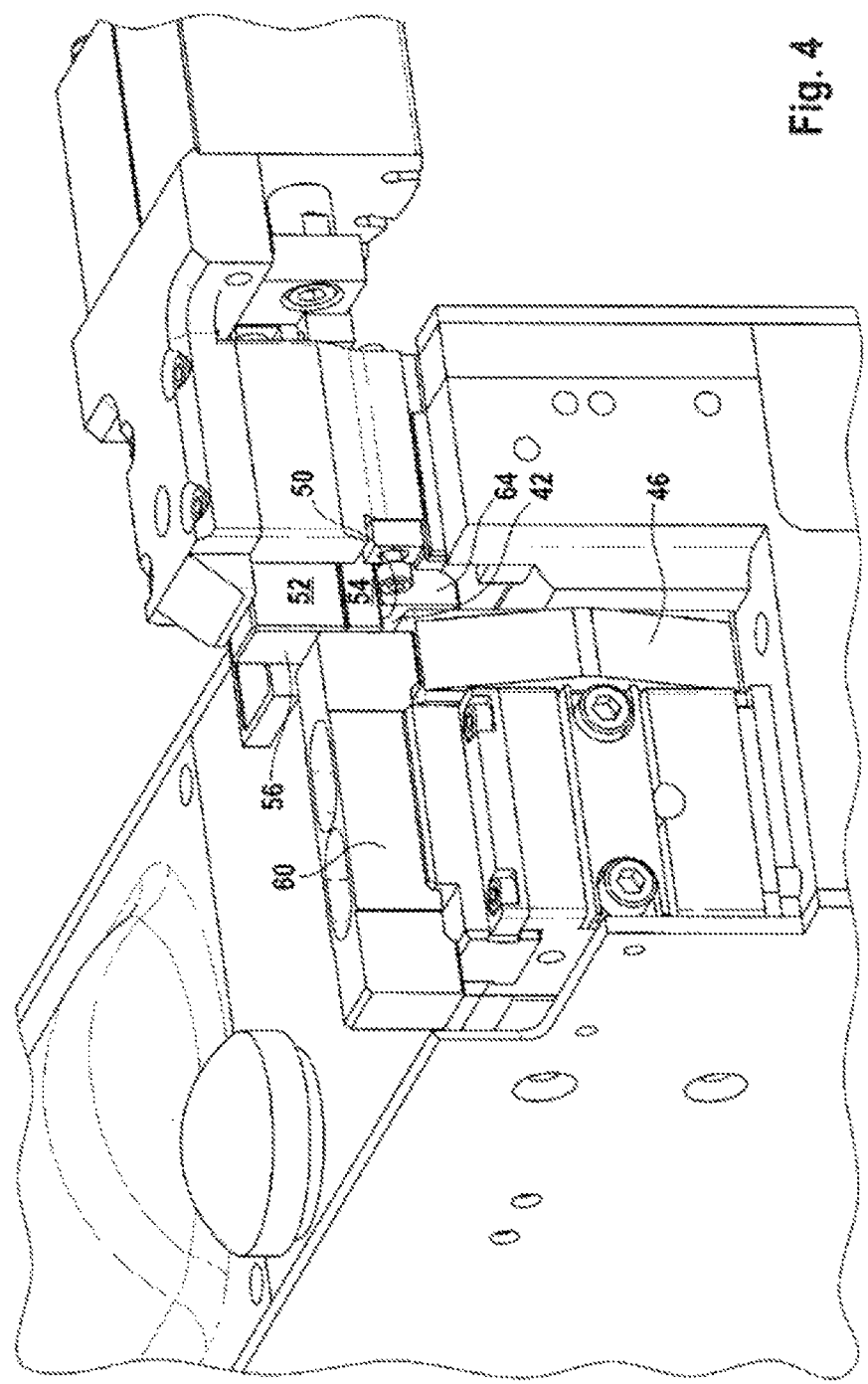

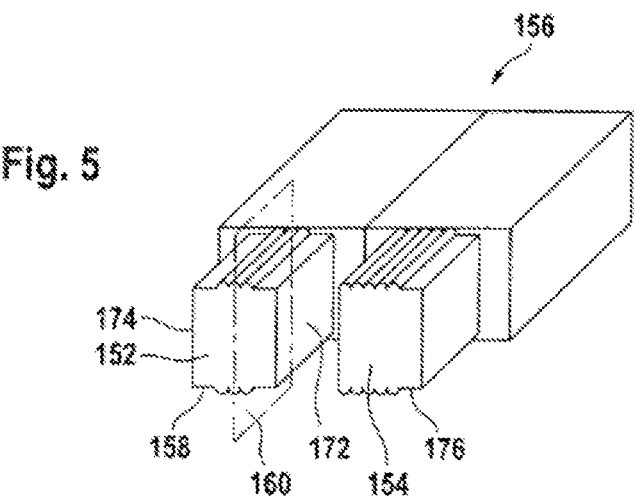
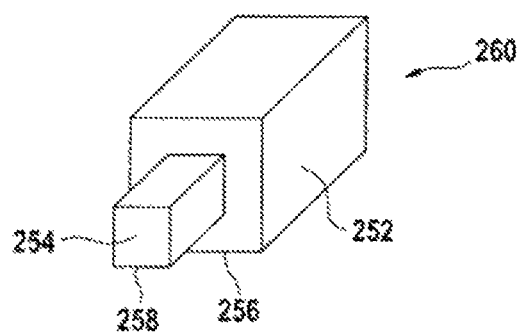

ULTRASONIC METAL WELDING DEVICE

This is a divisional application of U.S. application Ser. No. 16/636,425, filed Feb. 4, 2020, which is a 371 of International Application No. PCT/EP2018/072961, filed Aug. 27, 2018, which claims priority to German Patent Application No. 10 2017 119 809.1, filed Aug. 29, 2017, the contents of all of which are incorporated herein by reference.

The invention relates to a method for welding and/or deforming electrical conductors and/or casing ends surrounding them, such as tubular cable lugs, using a compression chamber that is adjustable at least in height and that is delimited on opposite sides by a section of a sonotrode as a first delimiting surface and by at least one section of a counter electrode as a second delimiting surface, the counter electrode and the sonotrode being adjusted relative to one another for welding while at the same time, pressurization of the electrical conductors and the excited sonotrode are adjusted. The height and width of the compression chamber are preferably adjustable. The compression chamber is delimited on opposite sides by a section of a sonotrode as a first delimiting surface and by at least one section of a counter electrode as a second delimiting surface, and on the remaining sides is delimited by one of a section of a lateral slide as a third delimiting surface and by a section of a delimiting element as a fourth delimiting surface.

The invention also relates to an ultrasonic metal welding device having a compression chamber that is adjustable at least in height, preferably in height and width, and that is delimited on opposite sides by a section of a sonotrode as a first delimiting surface and by at least one section of a counter electrode as a second delimiting surface, and if the height and width of the compression chamber are adjustable, said compression chamber is delimited on the remaining sides by one of a section of a lateral slide as a third delimiting surface and by a section of a delimiting element as a fourth delimiting surface, the counter electrode being displaceable relative to the sonotrode for closing or opening the compression chamber.

The invention also relates to an ultrasonic welding tool.

For producing cable harnesses, it is common in the automotive industry for strands to be connected by means of ultrasonic welding to form nodes. In this process, in order for signals to be transmitted or electricity conducted, care must be taken to ensure that a predefined number of strands are welded fully to form a node. The welding process itself can be used for verification, i.e., that a characteristic parameter of a height- and width-adjustable compression chamber is representative of the number of welded strands, so that a process control is ensured. In principle, however, this is possible only if each of the strands to be welded has a minimum cross-section.

Due to the continued development of the electronics being used, it is possible for strands consisting of individual wires or cores with cross-sections of, e.g., 0.13 mm$^2$ to be used, via which signals can be adequately conducted or current can adequately flow. If these types of strands are welded to strands of larger cross-section, there is a risk of the strands that are small in cross-section finding their way into spaces between larger strands, so that ultimately, the characteristic parameter, e.g., height or width, of the compression chamber determined after welding is no longer sufficiently representative of whether the predefined number of strands are actually materially bonded to one another.

Ultrasonic welding devices with which corresponding nodes can be welded are found, e.g., in DE 44 29 484 A1, EP 0 143 936 B1, DE 10 2005 004 899 A1 or DE 37 19 083 A1, which have compression chambers that are adjustable in terms of height and width.

A compression chamber that is likewise adjustable in terms of height and width is known from WO 95/10866 A1. However, with this ultrasonic welding device, the compression chamber is set to a predetermined height/width ratio regardless of the cross-section of the conductors to be welded.

A method for welding conductors can be found in DE 10 2011 014 801 A1. Said method uses a two-stage process. In a first step, multiple conductors are welded to form a first node, and then in a second step, this first node is welded to additional conductors or nodes.

In DE-Z.: Die Bibliothek der Technik [Library of Technology], Volume 108: Ultrasonic Metal Welding, Verlag Moderne Industrie, 86895 Landsberg 1995, principles of ultrasonic welding are described. In this publication, in particular on pages 20 et seq., the structure and function of an ultrasonic welding device for welding metal are explained. Reference is made expressly to the disclosure in this regard, as well as to the other documents cited as prior art insofar as the adjustment of a compression chamber or the function of an ultrasonic welding device are involved. In this respect, the content of the relevant documents is considered part of the disclosure of the present invention.

If mechanical fixation of the welded joint is desired in addition to the welding of conductors such as strands, various tools are typically used that lengthen the production process and make it more expensive.

DE 10 2008 045 751 A1, for instance, discloses an apparatus and a method for consolidation welding for use in connecting an electrical line to an electrical terminal contact. It is also possible to connect the terminal contact to the line using an insulation crimp that is produced using a separate crimping tool.

To connect a line composed of strands to an electrical terminal via a crimp connection, according to US 2015/0060135 A1 the ends of the strands are welded in a block-like form by means of ultrasonic welding, with an indentation running in the longitudinal direction of the strands being formed, in which crimping wings are fixed.

It is also possible for welding to be performed using various ultrasonic welding devices.

The object of the present invention is to develop a method of the type mentioned at the outset in such a way that a procedural simplification of the welding and where applicable the deformation of electrical conductors, in particular conductors of different cross-sections, can be achieved.

According to a further aspect, the object is to expand the cross-sectional areas of an ultrasonic welding device for conductors to be welded, without producing any restrictions in process monitoring as a result.

Properties of nodes to be welded are also to be optimized.

Another aspect is focused on making it possible to perform additional measures on conductors to be welded in order to ensure a secure electrical and mechanical connection and optionally to carry out a mechanical inspection of welded joints.

To achieve one or more aspects, the method mentioned at the outset is developed according to the invention essentially in that the counter electrode used is one that comprises sections of geometrically different working surfaces or is composed of at least two mutually displaceable sections. A sonotrode can be used which, as in the prior art, has a working surface that acts as a welding surface.

However, according to an inventive concept, it is also possible for the sonotrode to have at least two adjoining or adjacent working surfaces with geometrically different welding surfaces or one welding surface as a working surface and one working surface that has a shaping or formative function. The adjoining or adjacent working surfaces therefore are not to be confused with those that are arranged along the circumferential surface of a sonotrode and are aligned with the counter electrode by rotating the sonotrode. The respective desired working surface is selected from the adjoining or adjacent working surfaces by relative axial displacement of the sonotrode and the counter electrode along the longitudinal axis of the sonotrode to the section of the counter electrode that will be used in welding or in shaping or in the mechanical inspection of a welded joint.

In particular, it is provided that the section of the counter electrode, or the welding surface of the sonotrode, or both the section of the anvil and the welding surface are selected based on the electrical conductors to be welded.

In a further development to be emphasized, the invention provides that in a first welding process, electrical conductors are welded using a first section of the counter electrode to form an intermediate node, and that in a second welding process, the intermediate node is welded to at least one additional conductor and/or one additional intermediate node to form a node, wherein in the second welding process, a second section of the counter electrode that is different from the first section and/or a welding surface is used, which is different from that used in the first welding process.

With the position of the intermediate node unchanged, said node can be welded to the additional conductor and/or the additional intermediate node using the second section of the counter electrode.

A further proposal is characterized in that in a first welding process, a first section of the counter electrode is used in a first welding process to weld first conductors to form an end node or transit node, which is then welded and/or deformed using a second section of the counter electrode that is different from the first section.

It is also possible for a first section of the counter electrode to be used for welding conductors to form an end node and a second section of the counter electrode to be used for welding conductors to form a transit node.

A working surface of the counter electrode can also be configured for carrying out a crimping or cutting process.

A working surface of the counter electrode can also be configured as a testing element such as a testing jaw for checking the mechanical strength of a welded joint. For this purpose, a defined testing force is introduced into the welded joint between the working surface configured as a testing element and the sonotrode serving as counter element, the level of said testing force being such that if the welded joint is flawless, no damage will occur. If the welded joint is faulty, detectable changes can be identified on the welded joint.

It should also be emphasized that the working surface of the sonotrode that performs the shaping or embossing function can be used for embossing an indentation into a casing end that surrounds conductors, said indentation running in particular transversely and perpendicular to the longitudinal axis of the sonotrode.

According to the invention, strands of smaller cross-sections can be easily welded to strands of larger cross-sections using one and the same ultrasonic welding device, even if the ratio of the cross-section of the strand having the smallest cross-section to the overall cross-section of the node in and of itself generally does not or does not necessarily enable accurate process monitoring, in particular for determining the number of welded conductors.

After the strands of different cross-sections have been welded, a check can be made to determine whether the required number of strands are welded to one another, based on a characteristic parameter of the compression chamber.

Because the sections of the counter electrode, also called the anvil, and/or the sonotrode can have different structures, both transit nodes and end nodes can be welded readily using one and the same machine.

The sections of the counter electrode and, if applicable, of the sonotrode can have different profiling, in particular a finer profile and a coarser profile, so that strands with small cross-sections and strands with large cross-sections can be welded equally reproducibly and flawlessly without having to exchange tools or use different ultrasonic welding devices.

To ensure process monitoring, the cross-section of the smallest strand should not be less than, e.g., 7% of the cross-section of the node. If strands having a cross-section of 0.13 $mm^2$ are used, for example, then according to a corresponding rule, the overall cross-section must not be larger than approximately 1.9 $mm^2$.

According to the invention, multiple strands having a small cross-section, e.g., three strands each having a cross-section of 0.13 $mm^2$, can now be welded to form an intermediate node, and the intermediate node can subsequently be welded to additional strands to form a node having a cross-section of approximately 5.6 $mm^2$, without any disadvantages in terms of process monitoring. A section of the counter electrode, also called the anvil, having a finer structure is then used for welding the strands that are small in cross-section, and a section that has a coarser structure is used for welding the strands that are larger in cross-section.

In employing the different sections, according to the teaching of the invention, of the sections that can be displaced relative to one another, the one that has the desired structure, i.e., profiling, can be used to delimit the compression chamber. It is also possible for the respective section to be displaced parallel to the working surface of the sonotrodes to such an extent that a compression chamber of the desired cross-section is provided, which is bounded on four sides during the welding of nodes.

The sections that are displaceable relative to one another can be arranged side by side or one above the other, with a side-by-side arrangement offering the advantage that the sections can be assigned to different regions of the sonotrode, each of which forms a welding surface.

Since the sections can have symmetrical and asymmetrical profiles, there is the advantage that end nodes or transit nodes of the same quality can be welded on one and the same machine, depending on the profile that is used. An asymmetrical profile can be used for end nodes and a symmetrical profile can be used for transit nodes. Asymmetrical means that on the intake side of the compression chamber, a protrusion that is arcuate in cross-section projects outward from the working surface of the counter electrode and extends in the direction of the sonotrode. This is followed by protrusions and indentations. With a symmetrical profile, corresponding arcuate protrusions proceed outward from the working surface of the anvil on both the intake side and the outlet side of the compression chamber.

Of course, it is also possible for end nodes and transit nodes to be welded using a symmetrical profile.

Particularly if end nodes are also to be welded, according to one noteworthy proposal of the invention a stepped sonotrode can be used, so that the step itself serves as a stop surface for the ends of the strands to be welded. The sonotrode thus has two welding regions separated by the step, one of which can be designed for the welding of end nodes and the other for the welding of transit nodes. One of the mutually displaceable sections of the counter electrode is assigned to each of the regions.

A process known as double welding can be readily performed, in which a first node having a cross-section of, e.g., 3×4 mm² is welded and serves as an intermediate node, to which additional strands or another intermediate node can then be welded.

At least one working surface of the counter electrode can have a shaping geometry, for example for welding around lines.

However, it is also possible for a working surface to be geometrically configured such that a crimping or cutting function can be achieved.

Accordingly, in addition to the welding surface, the sonotrode can have a section that is used, e.g., for the mechanical shaping or embossing of a casing end that surrounds conductors, such as a tubular cable lug. For this purpose, particularly a comb-like or head-like section of the sonotrode is provided, which runs adjacent to the welding surface to allow a recess to be formed simultaneously in a casing end, e.g., in a cable lug, during the welding of strands, thereby achieving high mechanical strength of the connection between the casing end, i.e., the cable lug, and the electrical conductors. The region that produces the recess or indentation, i.e., the comb-like or bead-like section in particular having an arcuate shape in cross-section, is intended to run perpendicular to the longitudinal axis of the sonotrode that can be excited in the longitudinal axis direction, although this is not a mandatory feature. Rather, a parallel profile could also be selected, depending on the area of application.

A torsion sonotrode can likewise be used.

Welding is also carried out using the comb-like or bead-like section.

An ultrasonic metal welding device of the type described above is characterized in particular by the fact that
- the counter electrode comprises sections having geometrically different working surfaces or is composed of at least two sections that are displaceable relative to one another and the sonotrode comprises at least one working surface that acts as a welding surface, or
- that the counter electrode comprises sections having geometrically different working surfaces or is composed of at least two sections that are displaceable relative to one another and/or the sonotrode comprises at least two adjoining or adjacent working surfaces having geometrically different welding surfaces or one working surface that acts as a welding surface and one working surface that has a supplementary shaping or embossing function.

It is also possible for one of the working surfaces of the counter electrode to perform an additional function, e.g., a crimping or cutting function or a function for testing; the strength of a welded joint. For this purpose, e.g., a protrusion can extend outward from the working surface, tapering to a point and acting on the welded joint with a defined testing force.

In a refinement, the invention provides that the counter electrode comprises at least two sections that are displaceable parallel to one another and parallel to the working surface of the sonotrode and that can be assigned either to the working surface or to one of the working surfaces of the sonotrode. If the compression chamber is closed off peripherally, it is delimited by the section of the counter electrode.

The two sections can be arranged one above the other or side by side. The sections can also be displaceable telescopically relative to one another.

The displaceable sections themselves are intended to be actuated via separate drive means such as cylinders.

In particular, it is provided that the working surfaces of at least the counter electrode have different profiling from one another, wherein with respect to a plane that runs perpendicular to the respective working surface and intersects it centrally in the longitudinal direction of the compression chamber, preferably one of the profiles is configured as symmetrical and the other as asymmetrical or both are configured as symmetrical or as asymmetrical but have different structuring.

Inventive per se, optionally in combination with the features described above, and forming the basis of the invention is the possibility of the sonotrode having two welding surfaces that extend in planes that are spaced apart from one another vertically and run parallel to one another. If the sonotrode is a longitudinal vibrator that is set in vibration along its longitudinal axis, the welding surfaces run side by side.

To additionally perform shaping or embossing functions, it is provided that one of the working surfaces of the sonotrode has a comb-like or bead-like geometry, the extension of which runs parallel or perpendicular to the longitudinal axis of the sonotrode. This applies in particular to the welding and shaping of tubular cable lugs.

An ultrasonic welding tool in the form of a sonotrode is characterized in particular by the fact that the sonotrode has two welding surfaces that extend in planes that are spaced apart from one another vertically and run parallel to one another and adjoin one another.

To achieve additional functions, it is provided in particular that one of the working surfaces has a comb-like or bead-like geometry, the extension of which runs parallel or perpendicular to the longitudinal axis of the sonotrode.

The invention also relates to a method of the type mentioned at the outset, in which, for welding and/or deforming electrical conductors, the counter electrode has a single working surface and the sonotrode has at least two working surfaces, as has been described above.

The invention thus is also characterized by a method for welding and/or deforming electrical conductors and/or casing ends surrounding them, such as tubular cable lugs, using a compression chamber that is adjustable at least in height, preferably in height and width, and that is delimited on opposite sides by a section of a sonotrode as a first delimiting surface and by at least one section of a counter electrode as a second delimiting surface and is preferably delimited on the remaining sides by a section of a lateral slide as a third delimiting surface and by a section of a delimiting element as a fourth delimiting surface, wherein the counter electrode and the sonotrode can be displaced relative to one another, and wherein the sonotrode used is one that has at least two adjoining or adjacent working surfaces that have geometrically different welding surfaces or at least one welding surface as a working surface and one working surface with an embossing or shaping function. Additional details, advantages and features of the invention will be apparent not only from the claims and the features specified therein, alone and/or in combination, but also from the following description of preferred exemplary embodiments illustrated in the set of drawings.

Figure 7A:
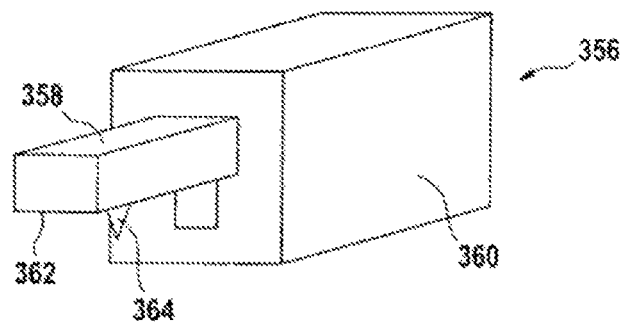
Figure 7B:
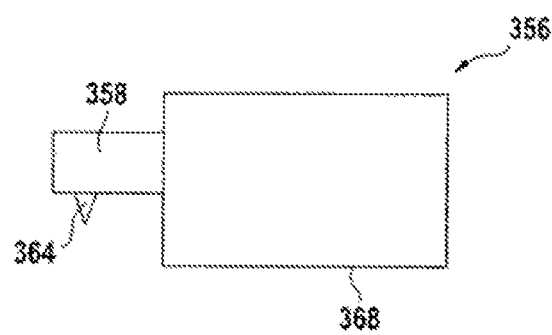
Figure 7C:
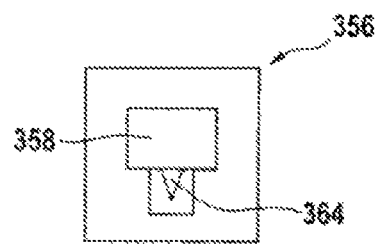
Figure 8:
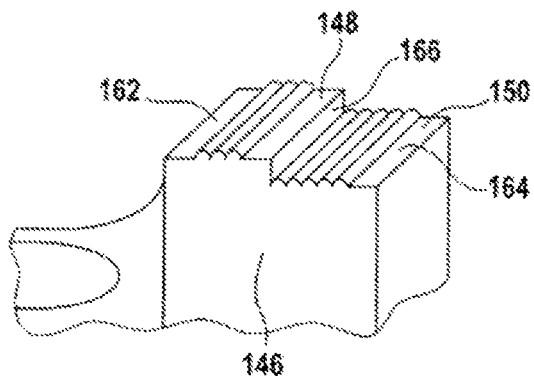
Figure 9:
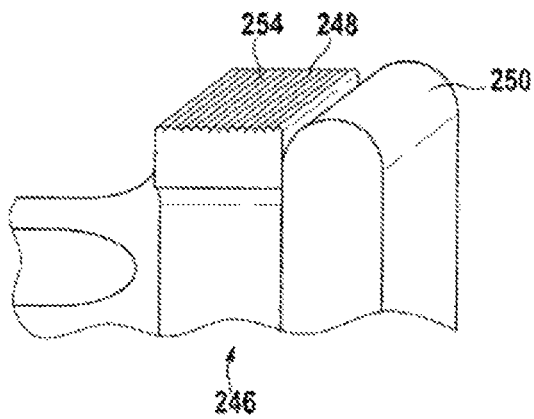
Figure 10:
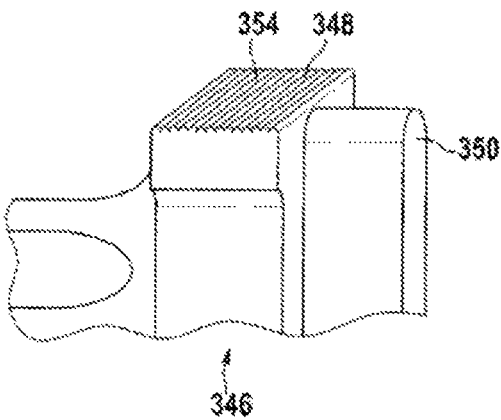
Figure 11A:
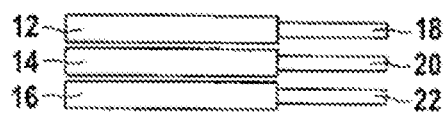
Figure 11B:
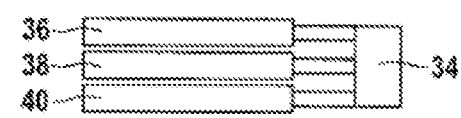
Figure 11C:
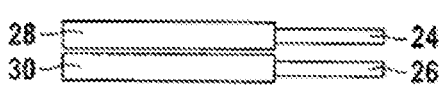
Figure 11D:
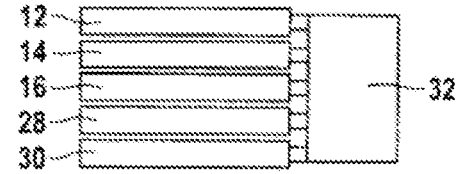
Figure 12A:
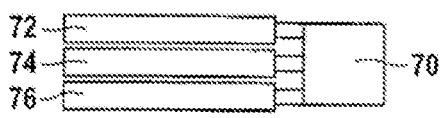
Figure 12B:
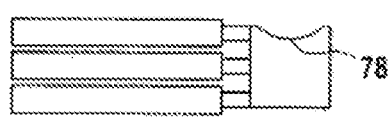

In the drawings:

FIG. 1 is a schematic depiction of an ultrasonic welding system,

FIG. 2 shows a section of an ultrasonic welding device with the compression chamber open, FIG. 3 shows the ultrasonic welding device according to FIG. 2 with a first section of a counter electrode with the compression chamber closed, FIG. 4 shows the ultrasonic welding device according to FIG. 2 with a second section of the counter electrode with the compression chamber closed, FIG. 5 shows a schematic depiction of a second exemplary embodiment of a counter electrode, FIG. 6 is a schematic diagram of a third embodiment of a counter electrode, FIGS. 7a-7c are schematic diagrams of a fourth embodiment of a counter electrode, FIG. 8 is a schematic depiction of a second embodiment of a sonotrode, FIG. 9 shows a third embodiment of a sonotrode, FIG. 10 shows a fourth embodiment of a sonotrode, FIGS. 11a-11d show strands of different cross-sections and node points thereof, and FIGS. 12a, 12b show strands welded to form an end node.

In FIG. 1, a system is depicted schematically, which is used for welding strands by means of ultrasound. The assembly comprises an ultrasonic metal welding device or machine 110, which as is customary, comprises a converter 112, optionally a booster 114, and a sonotrode 116. The sonotrode 116 or a working surface of this are assigned a counter electrode 118, a levelling plate 119 and a lateral slide 120, as described in DE 37 19 083 C1 or WO 95/10866 A1 or DE 44 29 684 A1, and the disclosures of which are expressly referenced. The sonotrode 116 or the functional or welding surface thereof, which can be made to vibrate in the direction of its longitudinal axis, the counter electrode 118, a delimiting element 119 designated as a levelling plate, which can be displaced together with the counter electrode 118 as a unit and relative to which the counter electrode 118 can be displaced in the direction of the lateral slide 120, and the lateral slide 120 together delimit a compression chamber, denoted by reference symbol 42 in FIGS. 2 to 4, which is adjustable in cross-section and in which the strands to be welded are placed.

The converter 112 is connected via a line 122 to a generator 124, which in turn leads via a line 126 to a PC 128. The PC is used for controlling or regulating the welding process. Additionally, welding parameters or the cross-section or width of the strands can be entered. Correspondingly stored values can also be retrieved.

Furthermore, sensors (not shown) can be provided for determining the height and/or width of the compression chamber before or after a weld is carried out. These values enable conclusions to be drawn about the number of compacted and welded strands. In this way, process monitoring can be carried out. Rather than one or more sensors for determining the height and width and thus the cross-section of the compression chamber, other sensors may be used or other measures may be applied in order to draw conclusions in a known manner regarding the number of strands welded.

To enable strands of different cross-sections, e.g., in the case of cable harnesses, to be welded in a reliable process that can be verified with respect to the number of strands, it is provided, in reference to the diagram of FIG. 11, that strands 12, 14, 16 that are to be materially bonded at their stripped regions 18, 20, 22 to stripped regions 24, 26 of other strands 28, 30 that are larger in cross-section to form, e.g., an end node or transit node 32, are first welded to one another. This is clear from a comparison of FIGS. 11a and 11b. Here, first the bare ends 18, 20, 22 are welded to form a first node 34 or intermediate node, which is situated at a substantial distance from the insulation 36, 38, 40 of the strands 12, 14, 16 in order to avoid mechanical loads that might possibly cause damage to the wires of the individual strands 18, 20, 22. The strands 12, 14, 16, i.e., their respective wires or cores in the region of the bare ends 18, 20, 22, can each have a cross-section, e.g., of 0.13 mm$^2$, without thereby limiting the teaching of the invention. If strands of this type were to be welded directly to the strands 28, 30 of larger cross-section, e.g., having cross-sections of 0.35 mm$^2$, i.e., bypassing the intermediate node 34, it could not be reproducibly determined from measurements of the height and/or width of the compression chamber or from some other characteristic parameter of the compression chamber whether the number of strands of different cross-sections required for a proper electrical connection, e.g., of a cable harness, are welded together. This disadvantage is avoided by first welding the intermediate node 34, the strands of which have a total cross-section of 0.39 mm$^2$, and then welding said intermediate node to the bare ends 24, 26 of the strands 28, 30 to form the node 32, which is depicted schematically in FIG. 11d.

With such dimensions, the cross-section of the intermediate node makes up more than 7% of the total cross-section and thus meets the standards of relevant branches of industry.

To enable the intermediate node 34 to be welded in one and the same ultrasonic welding device as the end node 32, according to the teaching of the invention the counter electrode of the ultrasonic welding device 110, depicted schematically in FIG. 1, is configured such that two sections that each have a working surface with different dimensions and/or different structuring are available for welding either the intermediate node 34 or the end node 32. Rather than an end node, a transit node could also be welded. This will be described in reference to FIGS. 2 to 4. These figures depict a detail of an ultrasonic welding device corresponding to that of FIG. 1.

FIG. 2 shows the ultrasonic welding device with the compression chamber 42 open, which is delimited by a first delimiting surface 44 of a sonotrode 46, the sonotrode head of which is structured as described in EP 1 680 254 B1, the disclosure of which is expressly referenced. Opposite the first delimiting surface 44 of the sonotrode 46, which is configured as a longitudinally vibrating sonotrode, the compression chamber 42 is delimited, when it is closed, by a second delimiting surface 48 or 50, which is formed by a first section 52 or a second section 54 of a counter electrode 56 assigned to the sonotrode 46. Sections 52, 54 of the counter electrode, also referred to below as the anvil 56, will be discussed in greater detail below.

A third delimiting surface 58 of the compression chamber 42 is formed by a lateral slide 60. The delimiting surface 62 of the compression chamber 42 opposite the third delimiting surface 58 is formed by a delimiting element referred to as a levelling plate 64. In the drawing, the levelling plate 64 is adjusted as a unit together with the anvil 56 vertically, i.e., perpendicular to the first delimiting surface 44, and with a small gap along the head of the sonotrode 46, as is well known from the prior art.

The compression chamber 42 has a rectangular cross-section with open end faces, which are penetrated by the longitudinal axis of the compression chamber 42.

According to the invention, the counter electrode 56 consists of a first or lower section 54 and a second or upper section 52, which sections, when used, may have widths that differ from one another transversely to the longitudinal axis of the compression chamber 42. This makes it possible to easily weld strands of different cross-sections. In this case, the working surface 50 of the first section 54 has a narrower width and thus a shorter extension transversely to the longitudinal axis of the compression chamber 42 and thus to the longitudinal axis of the sonotrode 46 than the working surface 48 of the second section 52. To this end, the first section 54 has a protrusion, which has a rectangular shape in cross-section parallel to the delimiting surface 44 and which faces the first delimiting surface 44 of the sonotrode 46, which serves as a welding surface or working surface. The surface of the protrusion 66 (section 54 of the counter electrode 56), which runs parallel to the first delimiting surface 44, thus forms the first working surface 50 of the anvil 56. With the first working surface 50, the strands 12, 14, 16, i.e., the bare ends 28, 30, 32 thereof, are welded to form the intermediate node 34 when, according to the diagram of FIG. 4, the strand ends 18, 20, 22 (not shown) are introduced into the compression chamber 42 and the compression chamber 42 is circumferentially closed. The anvil 56 is then displaced in the direction of the sonotrode 46, i.e. the first delimiting surface 44 of the compression chamber 42, so that when the sonotrode 46 is excited in the longitudinal direction, i.e., in longitudinal vibration, and force is simultaneously applied to the strands 12, 14, 16 via the anvil 56, the strands are welded to form intermediate node 34. The welding surface of the sonotrode 46 is in the vibration antinode. Before the compression chamber 42 is closed, the lateral slide 60 is displaced the required distance toward the levelling plate 64, i.e., the fourth delimiting surface 62, as is well known for compression chambers of ultrasonic metal welding devices that can be adjusted in terms of height and width.

The strands 12, 14, 16, or a plurality of corresponding strand units, which are likewise welded to form intermediate nodes, are then placed with additional strands having larger cross-sections, i.e., in the exemplary embodiment with the strands 28, 30, into the newly opened compression chamber 42 of the same ultrasonic welding device, in order to weld the node 32 according to FIG. 10*d* with the first section 54 retracted. The compression chamber is closed in accordance with the description given above, with the end face 68 of the first section 54 extending in alignment with the fourth delimiting surface 62, as shown in FIG. 3. In this case, the end face 68 forms the fourth delimiting surface. The working surface 48 of the second section 52 protruding beyond the end face 68 thus acts as a working surface during welding.

Rather than multiple strands of large cross-section, one or more strand units or intermediate nodes may also be used.

According to the invention, therefore, a compression chamber 42 is provided, which can be closed by means of either one of the sections 52, 54 of the anvil 56, the sections 52, 54 having working surfaces 48, 50 that differ from one another in order to enable a proper materially bonded connection appropriate for the cross-sections of the strands to be welded that will not result in damage to the wires of the strands. In this process, intermediate node 34 is formed at a distance from the insulation 36, 38, 40, in accordance with the diagrams of FIGS. 11*a*, 11*b*, in order to avoid mechanical loads on the exposed wires in the areas of transition to the insulation 36, 38.40, as this might otherwise result in breaks.

Working surfaces that differ from one another includes different profiling or different planar extensions, or both.

If the working surfaces 48, 50 proceeding from the sections 52, 54 are aligned parallel to the working surface or welding surface of the sonotrode 46 that forms the first delimiting surface 44 of the compression chamber 42, as shown in FIGS. 2 to 4, then one section of a counter electrode consisting of multiple sections can also have a geometry that is different therefrom. This will be described in reference to FIGS. 12*a*, 12*b*. According to FIG. 12*a*, the free ends of strands 72, 74, 76 are welded to form an end node 70, after which an indentation 78 is introduced into said end node in order to increase its strength. This can be enabled by the lower or first section 54, the side of which facing the sonotrode 46 has a protrusion in the shape of a segment of a circle in cross-section, for use in forming an indentation 78, which is arcuate in cross-section, into the end node 70, which extends transversely to the longitudinal direction of the strands 72, 74, 76.

The sections 52, 54 are configured as quasi slides, which are displaceable parallel to one another and parallel to the first delimiting surface 44, which is provided by the sonotrode 46. The lower section 54 can be held and guided by the levelling plate 64. If welding or shaping is to be carried out using the first section 54, then the first and second sections 54, 52 are preferably displaced as a unit, as is clear from FIG. 4.

Although it has been described within the context of the exemplary embodiments that the working surfaces of the sections 52, 54 are different from one another, it is naturally still within the scope of the invention for the working surfaces to have the same geometries or extensions.

Although sections 52, 54 of the anvil 56 are arranged one above the other, according to the exemplary embodiment shown in FIGS. 2-4, it is also possible for the sections to be arranged side by side, as shown purely by way of example in FIG. 5.

Here, the counter electrode, i.e., the anvil 156, has a first section 152 and a second section 154, which are displaceable in one plane. The sections 152, 154 may have different profiles on the compression chamber side, which are intended for welding an end node or transit node.

In the exemplary embodiment, section 152 of anvil 156 has a symmetrical profile, i.e., the structure of working surface 158 is symmetrical to a plane 160 that extends perpendicular to working surface 158 and centrally between the lateral surfaces 172, 174 of section 152. In contrast, section 154 has a working surface 176 that is asymmetrical and is thus intended for welding end nodes.

FIG. 6 shows a further embodiment of an anvil 256, which consists of a first section 252 and a second section 254, which is displaceable telescopically relative to the first section 252, i.e., it can be moved into and out of the latter. The undersides 258, 260 of the sections 252, 254 shown in the drawing form the working surfaces.

FIGS. 7*a*-7*c* show a further embodiment of a counter electrode 356, which is configured to enable inspection of a welded joint for quality. For this purpose, the counter electrode 356 has a section 358, which can be displaced in particular telescopically relative to the base body 360 of the counter electrode and on its underside 362, which faces the welding surface of the sonotrode 346, has a protrusion 364, which in the exemplary embodiment is configured as tapered. The protrusion 364 can then rest on a welded joint placed on a surface of a sonotrode and can act on the welded joint with a predefined testing force. Based on detectable changes in the welded joint, it can then be assessed whether the welded joint is good or defective. The underside 368 of the base body 360 itself can in turn serve as a working surface for welds to be carried out.

Not only can the counter electrode or the anvil have multiple sections with different configurations or geometries, the sonotrode can as well. This will be described in reference to FIGS. 8-10.

In the exemplary embodiment of FIG. 8, a section of a sonotrode 146 configured as a longitudinal vibrator is depicted schematically, in which two sections 148, 150 separated from one another by a step 166 are formed in the sonotrode head. The sections 148, 150 provide working surfaces 162, 164, which are spaced apart from one another and extend in parallel planes. The working or welding surface 162 of section 148 has a symmetrical profile and the working surface 164 of section 150 has an asymmetrical profile, as is clear from the corrugated structure. The step 166 running between the working surfaces 162, 164 can serve as a stop surface for strand ends that are to be welded by means of the asymmetrical profile of the working surface or welding surface 154.

The sections 148, 150 and thus the working surfaces 162, 164 meet one another in the longitudinal direction of the sonotrode 146.

If a transit node will be welded, the welding or working surface 162 is used, with section 152 being aligned toward said surface, assuming anvil 156 according to FIG. 5 is assigned. In contrast, section 154 is used for welding an end node by means of work surface 164.

It should be noted, however, that an end node with a symmetrical profile can also be welded.

FIG. 9 shows a further embodiment of a sonotrode 246, which has two sections 248, 250 at its head end. Section 248 has a working surface 254, which is configured as a welding surface and has a desired profile. Section 250 has a comb-like or bead-like geometry, i.e., an arcuate form in cross-section, so that, e.g., during the welding of strands, an indentation can be simultaneously impressed during welding into a casing end that surrounds said strands, such as a tubular cable lug, to increase mechanical strength. In the exemplary embodiment of FIG. 8, the corresponding section 250 extends perpendicular to the longitudinal axis of the sonotrode 256.

A sonotrode 346 according to the exemplary embodiment of FIG. 10 has a first section 348 with a working surface 354 intended for welding and a second section 350 intended for welding and embossing, e.g., for impressing an indentation into a metallic casing end, such as a tubular cable lug, in accordance with FIG. 9. The longitudinal axis of the bead-like or comb-like section 350 extends in the direction of the longitudinal axis of the sonotrode 346.

Based on the teaching of the invention, an ultrasonic metal welding system is provided, in particular in the form of a strand welding machine, which has a multi-part anvil, wherein the section thereof that is optimized for the intended welding process is used. The sections of the anvil can be arranged one above the other, side by side, or one inside the other. The working surfaces of the sections can be profiled or can have geometries designed for performing additional functions such as crimping or cutting or testing welded joints.

It is also possible for sonotrodes to be configured as having sections that form a plurality of working surfaces, in which case welding is performed using the section that is optimally suited for the welding process. A working surface may also be configured for shaping such as embossing.

Based on the teaching of the invention, nodes can be welded using one and the same machine, which would otherwise not be possible or could be produced only after exchanging tools or by using different welding machines in succession.

Node properties can be optimized.

Stepped sonotrodes can be used, in which case one section of the sonotrode is used for welding end nodes and the other section is used for welding transit nodes. A step running between the sections can also be used as a stop surface for conductors to be welded to form an end node.

In welding end nodes or transit nodes, it is also possible to ensure that any line ends and/or protruding individual wires that are left unwelded after ultrasonic welding, which are otherwise frequently present, are at least additionally pressed on. For instance, a first section can be used for welding the end node or transit node itself, with the other section being used for at least pressing the line ends on.

If, as is preferable, the sections of the counter electrode are displaceable relative to one another, it is still within the scope of the invention for a counter electrode to have at least two sections that form one unit and have working surfaces that differ from one another, wherein one working surface can be used in particular for welding and the other working surface for shaping.

The invention claimed is:

1. An ultrasonic metal welding device comprising:
a compression chamber that is adjustable at least in height, and that is delimited on opposite sides by a section of a sonotrode as a first delimiting surface, and by at least one section of a counter electrode as a second delimiting surface;
wherein the section of the sonotrode is opposite the at least one section of the counter electrode;
wherein the sonotrode comprises at least one welding surface;
wherein the compression chamber closable or operable by a relative movement between the counter electrode and the sonotrode; and
wherein the counter electrode comprises:
at least first and second working surfaces separated from one another; wherein the at least first and second working surfaces have different geometries; and wherein only one of the at least first and second working surfaces is configured to close the compression chamber;
or,
at least two sections that are displaceable and selectable relative to one another, and that form at least two working surfaces; and wherein one of the at least two sections is configured to close the compression chamber.

2. The ultrasonic metal welding device according to claim 1, wherein one of the working surfaces of the counter electrode is configured for crimping or cutting.

3. The ultrasonic metal welding device according to claim 1, wherein the counter electrode comprises at least two sections that are displaceable parallel to one another, and parallel to the welding surface of the sonotrode, and wherein the at least two sections selectively delimit the compression chamber.

4. The ultrasonic metal welding device according to claim 3, wherein the at least two sections of the counter electrode are arranged one above the other, or side by side.

5. The ultrasonic metal welding device according to claim 3, wherein the at least two sections of the counter electrode are displaceable telescopically relative to one another.

6. The ultrasonic metal welding device according to claim 1, wherein the sections can be actuated by a separate drive means.

7. The ultrasonic metal welding device according to claim 1, wherein the working surfaces of at least the counter electrode have different profiles, wherein with respect to a plane that runs perpendicular to the respective working surface and intersects said surface centrally in the longitudinal direction of the compression chamber, one of the profiles is configured as symmetrical and the other as asymmetrical, or both are configured as symmetrical or as asymmetrical with mutually different structuring.

8. The ultrasonic metal welding device according claim 1, wherein the sonotrode comprises two welding surfaces, extending in planes that are spaced apart from one another vertically and run parallel to one another, and which adjoin or are immediately adjacent to one another.

9. The ultrasonic metal welding device according to claim 1, wherein the at least one welding surface of the sonotrode extends parallel to, or perpendicular to, the longitudinal axis of the sonotrode, and has a geometry in a form of a comb or a bead with an arcuate cross-section.

10. The ultrasonic metal welding device according to claim 1, wherein the counter electrode comprises at least first and second working surfaces separated from one another; wherein the at least first and second working surfaces have different geometries; and wherein one of the at least first and second working surfaces is configured to close the compression chamber.

11. The ultrasonic metal welding device according to claim 1, wherein the counter electrode comprises at least two sections that are displaceable and selectable relative to one another, and that form at least two working surfaces; and wherein one of the at least two sections is configured to close the compression chamber.

12. The ultrasonic metal welding device according to claim 1, wherein the counter electrode comprises a protrusion.

13. The ultrasonic metal welding device according to claim 12, wherein the protrusion is tapered.

14. The ultrasonic metal welding device according to claim 12, wherein the protrusion is disposed on an underside of the counter electrode facing the welding surface of the sonotrode.

15. The ultrasonic metal welding device according to claim 12, wherein one of the at least two working surfaces of the counter electrode is adapted to close the compression chamber.

* * * * *